United States Patent
Santossio et al.

(10) Patent No.: US 10,386,996 B2
(45) Date of Patent: Aug. 20, 2019

(54) COMMUNICATING EMOTIONAL INFORMATION VIA AVATAR ANIMATION

(71) Applicant: Microsoft Technology Licensing, LLC, Redmond, WA (US)

(72) Inventors: Randy Santossio, Bellevue, WA (US); Mark Kobrin, Seattle, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 92 days.

(21) Appl. No.: 14/736,704

(22) Filed: Jun. 11, 2015

(65) Prior Publication Data

US 2016/0364895 A1 Dec. 15, 2016

(51) Int. Cl.
| | |
|---|---|
| G06T 13/40 | (2011.01) |
| G06T 13/00 | (2011.01) |
| G06F 3/0482 | (2013.01) |
| G06F 3/01 | (2006.01) |
| G06F 3/0484 | (2013.01) |
| G06Q 50/00 | (2012.01) |
| A63F 13/00 | (2014.01) |
| G06K 9/00 | (2006.01) |

(52) U.S. Cl.
CPC ............ *G06F 3/0482* (2013.01); *A63F 13/00* (2013.01); *G06F 3/011* (2013.01); *G06F 3/013* (2013.01); *G06F 3/015* (2013.01); *G06F 3/017* (2013.01); *G06F 3/04842* (2013.01); *G06K 9/00885* (2013.01); *G06Q 50/01* (2013.01); *A63F 2300/5553* (2013.01); *A63F 2300/6607* (2013.01); *G06F 2203/011* (2013.01); *G06K 2009/00939* (2013.01)

(58) Field of Classification Search
CPC ...................................................... G06T 13/40
USPC ......................................................... 345/473
See application file for complete search history.

(56) References Cited

U.S. PATENT DOCUMENTS

| 8,027,518 B2 | 9/2011 | Baker et al. | |
|---|---|---|---|
| 8,506,396 B1 | 8/2013 | Snyder et al. | |
| 2002/0133552 A1* | 9/2002 | Ooi | H04L 29/06 709/205 |
| 2004/0095344 A1* | 5/2004 | Dojyun | G06T 13/40 345/419 |

(Continued)

OTHER PUBLICATIONS

ISA European Patent Office, International Search Report and Written Opinion Issued in PCT Application No. PCT/US2016/036570, dated Oct. 7, 2016, WIPO, 17 pages.

*Primary Examiner* — Yi Yang
(74) *Attorney, Agent, or Firm* — Alleman Hall Creasman & Tuttle LLP

(57) ABSTRACT

Examples are disclosed herein that relate to avatar animation. One example provides a computing device comprising a processor and a storage device comprising instructions executable by the processor to receive non-contact biometric data of a user from a biometric sensing system, establish a baseline emotional state of the user based on the non-contact biometric data, output an avatar representing the user with an animation representing the baseline emotional state, observe a threshold change in the non-contact biometric data, and in response to observing the threshold change in the non-contact biometric data, output the avatar with an animation representing a new emotional state.

18 Claims, 9 Drawing Sheets

(56) References Cited

U.S. PATENT DOCUMENTS

| | | | |
|---|---|---|---|
| 2006/0188144 A1* | 8/2006 | Sasaki | G06K 9/00281 |
| | | | 382/154 |
| 2008/0077421 A1* | 3/2008 | Kobayashi | G06Q 10/10 |
| | | | 705/301 |
| 2010/0146407 A1 | 6/2010 | Bokor et al. | |
| 2010/0240458 A1 | 9/2010 | Gaiba et al. | |
| 2011/0083167 A1* | 4/2011 | Carpenter | G06F 17/30563 |
| | | | 726/4 |
| 2011/0124977 A1 | 5/2011 | Winarski | |
| 2011/0201414 A1 | 8/2011 | Barclay et al. | |
| 2011/0225518 A1* | 9/2011 | Goldman | G06F 3/04815 |
| | | | 715/757 |
| 2012/0172681 A1* | 7/2012 | Sun | A61B 5/067 |
| | | | 600/301 |
| 2013/0011819 A1 | 1/2013 | Horseman | |
| 2013/0077823 A1 | 3/2013 | Mestha et al. | |
| 2013/0215113 A1* | 8/2013 | Corazza | G06T 13/40 |
| | | | 345/420 |
| 2013/0252731 A1 | 9/2013 | Dugan et al. | |
| 2013/0325493 A1 | 12/2013 | Wong et al. | |
| 2014/0100464 A1 | 4/2014 | Kaleal et al. | |
| 2014/0218370 A1* | 8/2014 | Mishra | G06T 13/00 |
| | | | 345/473 |
| 2014/0222522 A1* | 8/2014 | Chait | G06Q 10/0637 |
| | | | 705/7.36 |
| 2014/0298364 A1* | 10/2014 | Stepanov | H04N 21/25 |
| | | | 725/10 |
| 2014/0313208 A1 | 10/2014 | Filev et al. | |

* cited by examiner

COMMUNICATING EMOTIONAL INFORMATION VIA AVATAR ANIMATION

BACKGROUND

In some computing environments, a user may be represented by a computer-generated avatar. The avatar may take a three-dimensional anthropomorphic form, for example. Such an avatar may be used within a variety of contexts, including but not limited to games and social networking contexts.

SUMMARY

Examples are disclosed herein that relate to animating an avatar to communicate emotional information. One example provides a computing device comprising a processor and a storage device comprising instructions executable by the processor to receive non-contact biometric data of a user from a biometric sensing system, establish a baseline emotional state of the user based on the non-contact biometric data, output an avatar representing the user with an animation representing the baseline emotional state, observe a threshold change in the non-contact biometric data, and in response to observing the threshold change in the non-contact biometric data, output the avatar with an animation representing a new emotional state.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

As mentioned above, a computer-generated avatar may be used to represent a user in a computing environment. Some avatars may be animated according to predetermined conditions established by a developer of the avatar. However, such animations are generally fixed in nature, and not reflective of a user's actual state. Accordingly, examples are disclosed herein that relate to animating avatars in different manners that communicate emotional information regarding the user represented by the avatar.

Figure 1:
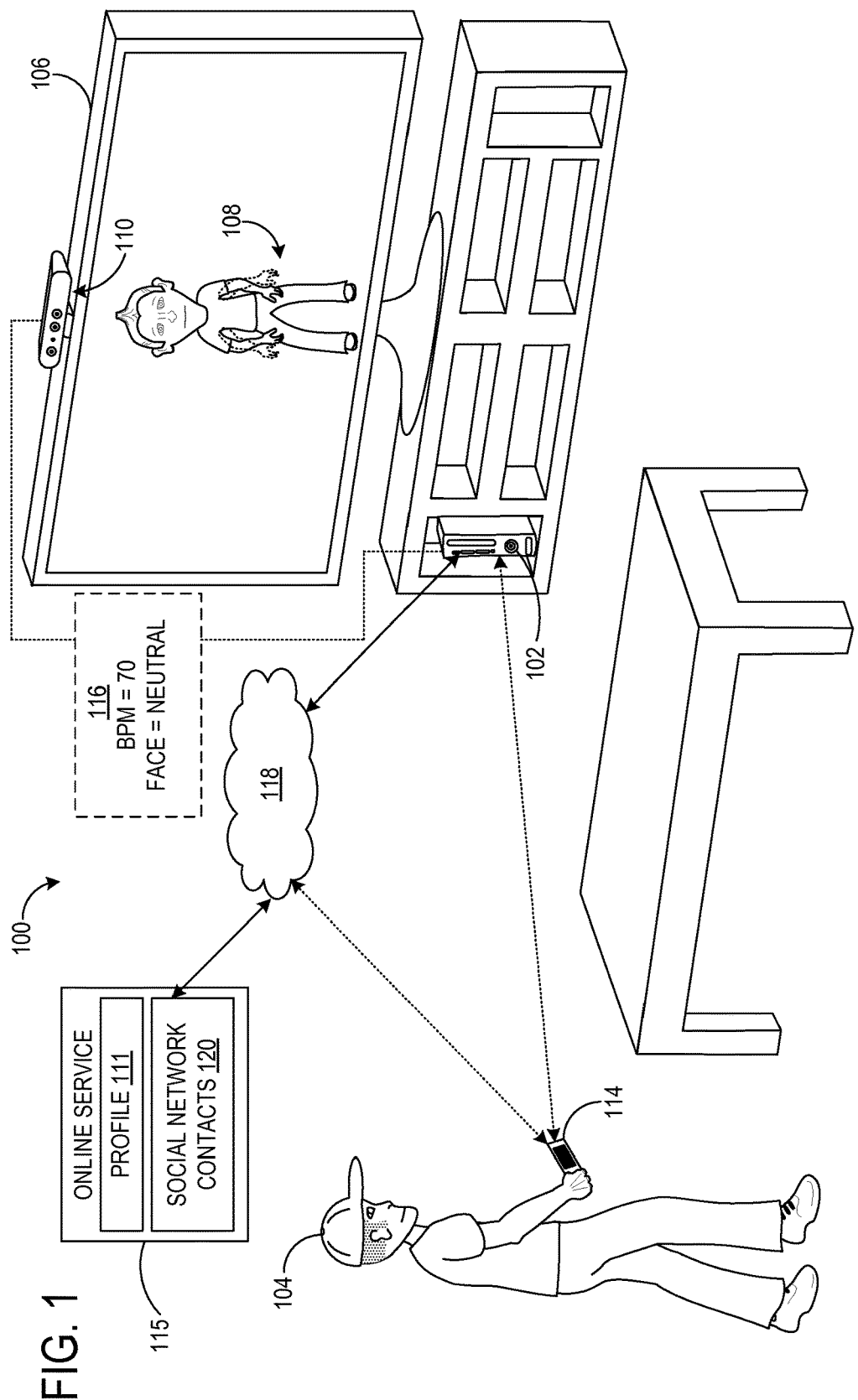
FIG. 1 shows an example interactive entertainment environment comprising a computing device, and illustrates an example avatar.

FIG. 1 shows an example interactive computing environment 100 comprising a computing device 102. While environment 100 is depicted as a home environment, it will be appreciated that the approaches described herein may be used in any suitable environment. FIG. 1 further depicts a user 104 interacting with computing device 102. Computing device 102 is depicted as a multimedia computing device or game console, but may take any suitable form, including but not limited to a general purpose computing device, laptop computing device, tablet/phone/other mobile devices, etc.

Computing device 102 outputs graphical content to a display 106. In FIG. 1, the content includes an avatar 108 representing user 104. In the example depicted in FIG. 1, avatar 108 is an anthropomorphic three-dimensional representation of user 104. In other examples, avatar 108 may take other anthropomorphic forms (e.g., animal, mechanical, robotic), as well as non-anthropomorphic forms. In some examples, various aspects of avatar 108 may be modeled based on attributes of user 104. For example, one or more of the clothes, face, body, hair, and skin color of avatar 108 may be modeled based on the corresponding properties of user 104.

Avatar 108 is depicted as being output with animation representing the emotional state of user 104. To establish the emotional state of user 104, computing device 102 may receive non-contact biometric data for user 104 from a sensing system 110. As used herein, "non-contact biometric data" refers to biometric data collected by devices not in physical contact with the user for which the data is collected. As such, sensing system 110 may include one or more sensors configured to sense non-contact biometric data. Examples include, but are not limited to, an infrared camera, visible light camera, depth camera, and/or microphone. Depending on the sensors included, biometric sensing system 110 may be used to sense a variety of biometric data of user 104, such as heart rate, eye (e.g., pupil) dilation, skeletal biometrics, gestures, facial expressions, and/or blood pressure, as non-limiting examples. Details regarding the determination and use of the non-contact biometric data types listed above are provided below with reference to FIG. 9.

In some examples, computing device 102 may establish a baseline emotional state of user 104 based on non-contact biometric data collected by biometric sensing system 110. The baseline emotional state may serve as a reference to which differing emotional states, identified by observing changes to the non-contact biometric data, may be compared so that departures from the baseline emotional state may be detected. In some examples, the baseline emotional state may be classified as a relatively average emotional state, for example, when the user does not display significant happiness, sadness, anger, excitement, or fatigue. In other examples, a baseline emotional state may represent any other suitable state.

A baseline emotional state also may be established based on user input of an emotional state. For example, user may input a current emotional state to computing device 102 via mobile device 114 or other suitable device (e.g. a game controller). The current emotional state either may be input directly to computing device 102 (e.g. where the mobile device 114 is in communication with the computing device 102 and where avatar data is stored locally on computing device 102), or may be input to a remote service 115 at which user profile information comprising avatar data for user 104 is stored and accessed by the computing device 102. In this example, the avatar may express animations related to the emotional state input by the user, rather than that detected from sensor data. This may help to mitigate or avoid the assignment of an erroneous baseline emotional state, e.g. where a user may have an atypically high resting heart rates that would otherwise result in identification of a relatively excited emotional state. This also may allow a user to express a desired emotional state to others who may view the avatar (as described below), even where the user's biometric information may not match the input emotional state. Where data from both a user input and a non-contact biometric sensing system are used to determine an emotional state of a user, different weights may be applied to each type of data. For example, a higher weight may be applied to a user input initially, and the weight may decay over time as the user input becomes less relevant to a current state.

FIG. 1 shows avatar 108 displayed with an animation representing the baseline emotional state of user 104. Accordingly, avatar 108 is animated to exhibit a relatively neutral emotional state—e.g., the expressions and animations of the avatar are not configured to represent significant happiness, sadness, anger, excitement, or fatigue. In this state, animations may instead correspond to actions associated with typical idleness—e.g., breathing, looking around, scratching, and fidgeting. The facial expression of avatar 108 may further be animated to correspond with the baseline emotional state.

Computing device 102 may establish the baseline emotional state at various times and frequencies. In some implementations, the baseline emotional state may be established upon initiation of a user session with computing device 102—e.g., each time the user logs in with user-specific credentials and/or to a user profile 111. The baseline emotional state may alternatively or additionally be established on an application basis—e.g., each time a new application is executed on computing device 102, or in response to certain actions and/or states in an application such as at each new round in a game application. In yet other implementations, the baseline emotional state may be used on a relatively more persistent basis across multiple user sessions—e.g., the baseline emotional state, once established for user 104, may be stored in user profile 111 at a remote service 115 and accessed at each user session of user 104. In this example, non-contact biometric data collected to establish the baseline emotional state may be stored in the user profile.

A user input of an emotional state may be made in any suitable manner. For example, mobile computing device 114 may present a user interface comprising a list of selectable emotional states presented by mobile computing device 114 from which a state may be selected. Likewise, such a user interface may be presented directly on display 106 for selection via a user input device for interacting with display 106.

FIG. 1 also schematically shows example non-contact biometric data 116 collected for user 104 by biometric sensing system 110 and provided to computing device 102. The baseline emotional state of user 104 may be established based on data 116, and/or previously acquired data. Data 116 includes a heart rate of user 104 in the form of beats per minute (BPM) and a facial expression of the user, indicating a relatively neutral facial expression.

Figure 2:
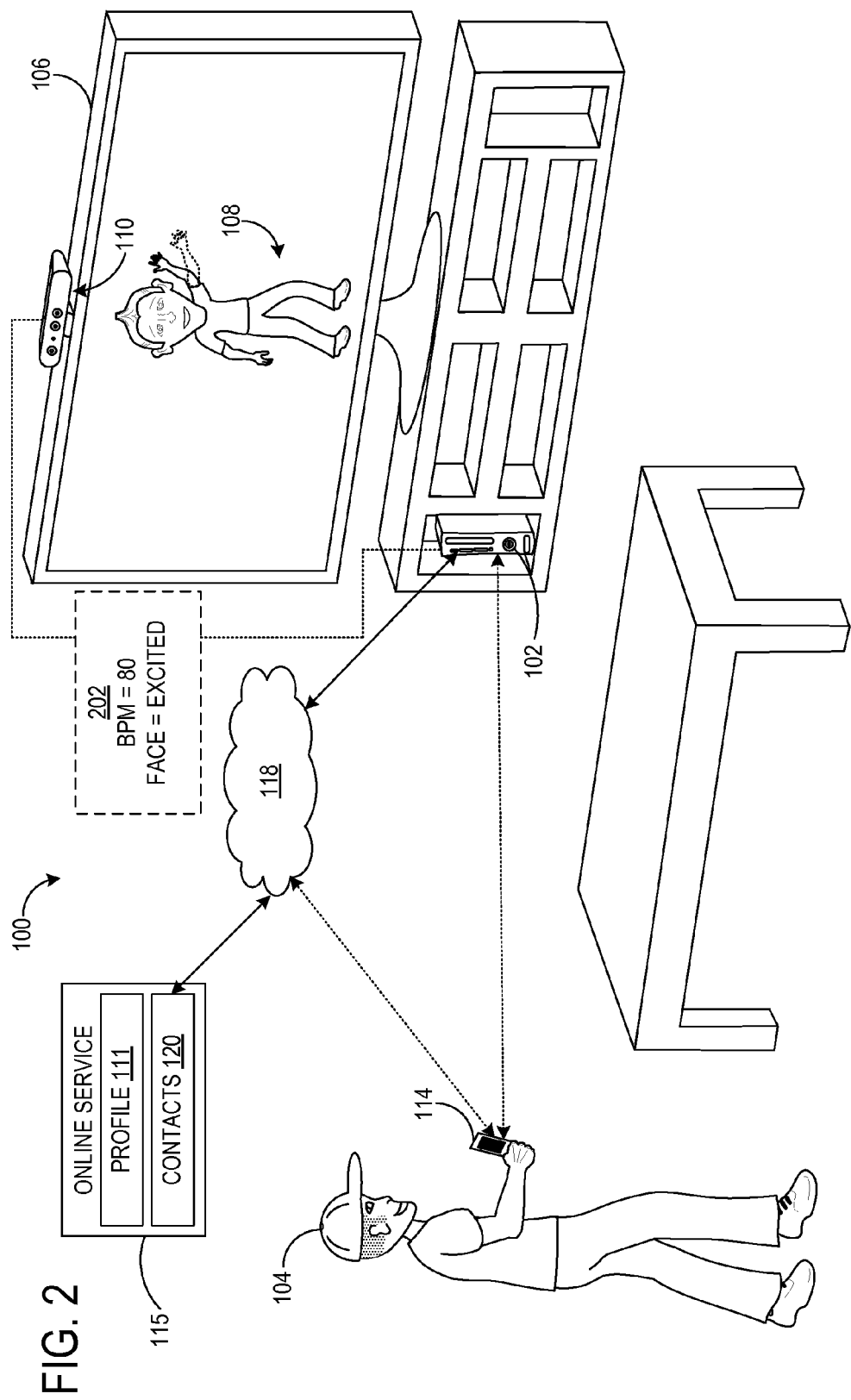
FIG. 2 illustrates an example of updating an appearance of the avatar of FIG. 1 in response to a user's emotional state.

FIG. 2 shows example non-contact biometric data 202 collected for user 104 by biometric sensing system 110 at a time after collection of data 116. In FIG. 2, the heart rate of user 104 in data 202 has increased relative to the heart rate in data 116 sufficiently to pass a threshold change. The threshold change may correspond to any suitable change in the biometric data, such as a change in heart rate by +/−10 BPM. Thresholds for other non-contact biometric data may be suitably defined according to their types. For example, in the case of skeletal biometrics and/or gestures, a threshold may be defined as a threshold magnitude of change in position of one or more body parts, for example. Non-contact biometric data 202 also indicates a change in the relatively neutral facial expression of user 104 to a relatively excited facial expression.

Any suitable action may be taken by computing device 102 in response to detecting these changes. For example, the threshold change in heart rate may trigger a transition from one emotional state to a different emotional state, and the resulting display of an animation for the different emotional state. Further, the change in facial expression may help to select an appropriate new state, for example, a happy excited state or angry excited state.

In response to observing the threshold change in the non-contact biometric data of user 104 (e.g., from data 116 to data 202), computing device 102 may output avatar 108 with an animation representing a new emotional state. As described above, the threshold change may indicate a transition from one emotional state (e.g., the baseline emotional state) to another, different emotional state. Avatar 108 is accordingly updated via animation to reflect the new emotional state, which in this example is a relatively excited and happy emotional state. Any suitable animations may be used to animate avatar 108 and represent the new emotional state. For example, such animations may include gyrating, dancing, and/or jumping. In the example depicted in FIG. 2, the pose and facial expression (e.g., smiling) of avatar 108 are also updated to reflect the new emotional state.

It will be appreciated that the animation of avatar 108 may be updated at any suitable frequency. In some examples, the animation of avatar 108 may be updated at a frequency sufficient to enable the avatar to reflect changes in the emotional state of user 104 as they occur (e.g., approximately in real time), which may increase user engagement with the avatar. As such, when the user's biometric data returns from the values of FIG. 2 to the values of FIG. 1, this may trigger display of the avatar with the animations of FIG. 1, or another animation associated with a less excited emotional state than that of FIG. 2.

Computing device 102 may be configured to output avatar 108 with animations for any suitable number and type of emotional states. In some examples, the set of emotional states may be selected so that a significant portion of the gamut of human emotion can be represented by avatar 108. As a non-limiting example, a set of emotional states may include a neutral emotional state, a happy state, an angry state, a sad state, an excited happy state, an excited angry state, a relaxed alert state, and a relaxed sleepy state. Different animations and/or expressions may be provided for the avatar in each of these emotional states.

In some implementations, each emotional state may include substates reflecting a relative degree of intensity of the user's emotions within that state, wherein animations for the avatar vary for different substates. As with the emotional state, each substate may be defined by threshold biometric data. As a non-limiting example, an excited happy emotional state may include four degrees that correspond to a successively greater magnitude of excited happiness—e.g., a first degree corresponding to relatively minimal excited happiness (e.g., at 80 BPM), a second degree corresponding to excited happiness relatively greater than that of the first degree (e.g., at 84 BPM), a third degree corresponding to excited happiness relatively greater than that of the first and second degrees (e.g., at 88 BPM), and a fourth degree corresponding to excited happiness relatively greater than that of the first, second, and third degrees (e.g., at 92 BPM). Each degree of an emotional state may be represented by a respective animation, which may enable the update of avatar animation to better reflect gradual and/or complex changes in user emotional state. Additionally, some degree of hysteresis may be applied at state boundaries to prevent instabilities at such boundaries.

Animations also may change based upon on other factors than changes in detected emotional states or substates. For example, a speed of motion within an animation may vary based on how much time passes between changes in emotional states or substates, wherein the speed and/or magnitude of animation motion may be greater where changes between emotional states or substates happen more quickly. Further, a speed and/or magnitude of an animation motion may decrease over time (e.g. according to a decay function) when a user's biometric data remains within an emotional state, such that the animation drops in intensity as an emotional state or substate is maintained. In some implementations, the decay may transition the animation to the neutral emotional state animation after a sufficiently long time. It will be understood that the time durations of animations (e.g. the decay rate) and non-contact biometric data thresholds used to trigger the animations may be pre-selected and applied to all users, or may be tailored to individual users, e.g. by adapting to user behaviors over time.

Figure 3:
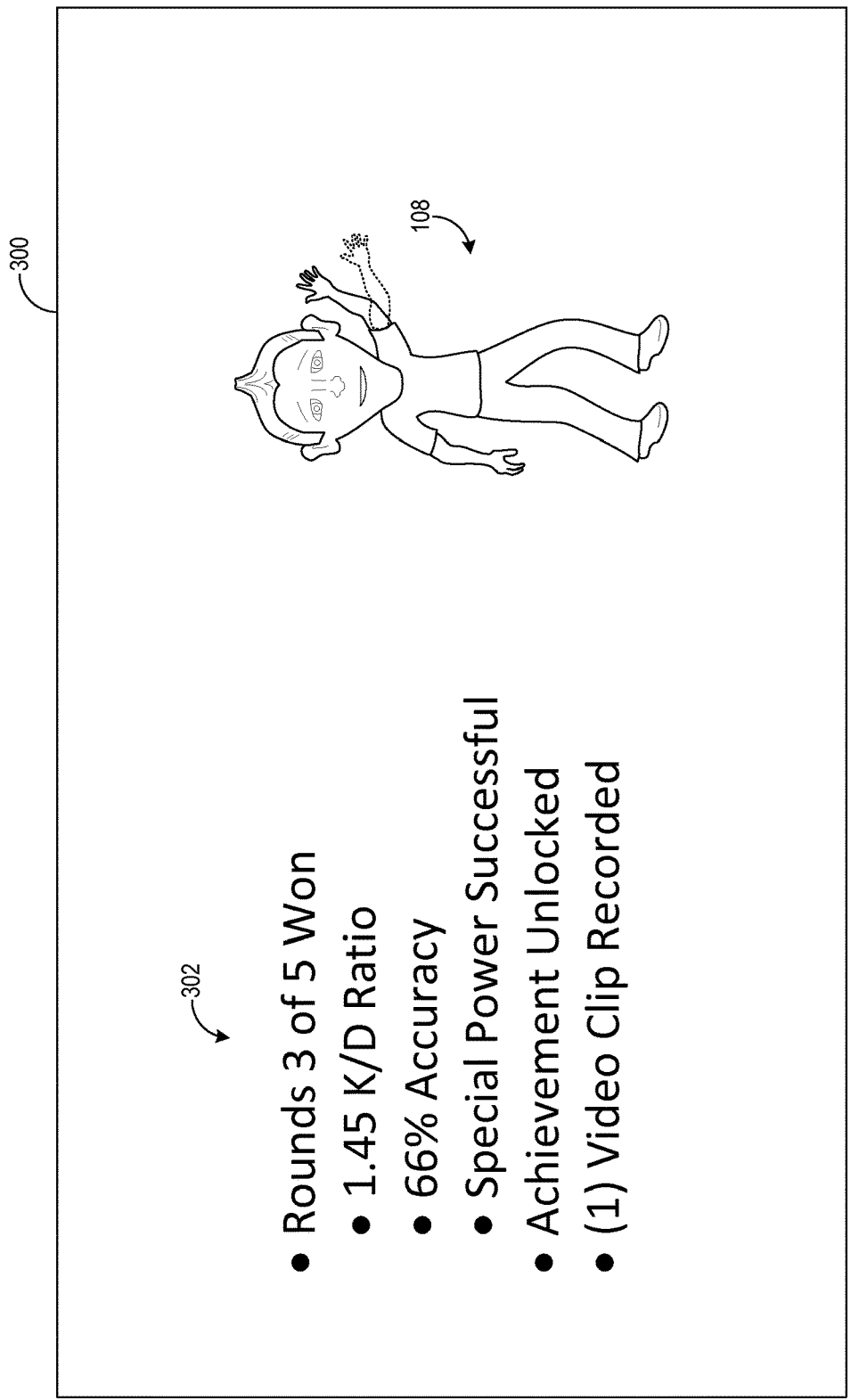
FIG. 3 shows an example user interface illustrating a notification.

In some implementations, notifications may be used to trigger changes in avatar animation based upon possible emotional states associated with the notifications. FIG. 3 shows an example user interface 300 illustrating an example notification 302. Notification 302 conveys information regarding several events that occurred in a game application played by user 104 and executed on computing device 102, namely, that the user won a majority of the rounds played, obtained an achievement, and recorded a video clip. Computing device 102 may receive notification 302 from the application of these events, and in response output avatar 108 with an animation representing an emotional state based on the notification. FIG. 3 shows avatar 108 (which may displayed in user interface 300 or a different user interface) displayed with an animation representing a relatively excited happy emotional state based upon the user's success in the game.

Figure 4:
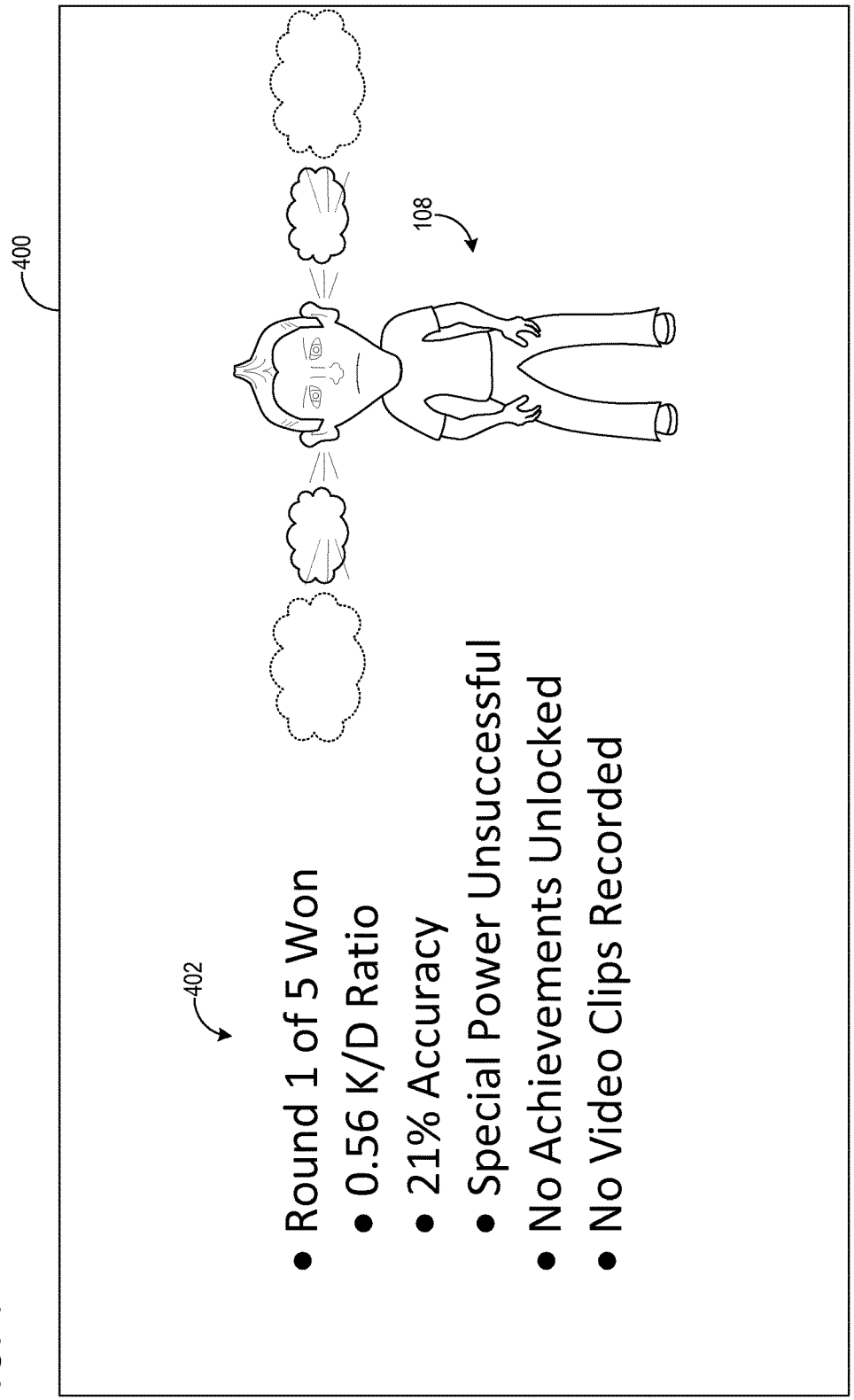
FIG. 4 shows another example user interface illustrating a notification.

FIG. 4 shows another example notification 402, which indicates less user success in the game application—namely, that the user lost a majority of the rounds played, no achievements were obtained, and no video clips were recorded. Computing device 102 may receive notification 402 from the game application, and output avatar 108 with an animation representing an emotional state based on the notification. In this example, avatar 108 is animated to represent a relatively excited angry emotional state, reflecting a potentially frustrating game experience. It is noted that such notifications may be used as contextual data to trigger the display of different animations for different emotional states, even where non-contact biometric information is similar or the same for the different emotional states.

It will be appreciated that the scenarios depicted in FIGS. 3 and 4 are provided as examples and are not intended to be limiting, as notifications from applications other than games may be used to select an emotional state for animating an avatar. For example, in a communication application, notifications of an incoming message, request to chat, reception of a recorded message, etc., may trigger a change to a different emotional state and avatar animation. Likewise, operating system notifications (e.g., opening/closing of an application, changing application focus, system updates), and/or any other suitable notification, also may be used.

Returning to FIG. 1, computing device 102 may be configured to access, via computer network 118, a social network 120 comprising one or more contacts of user 104, and to output respective avatars of one or more contacts in social network 120. As such, computing device 102 may be configured to output the avatars of social network contacts with animations reflecting emotional states as well.

Figure 5:
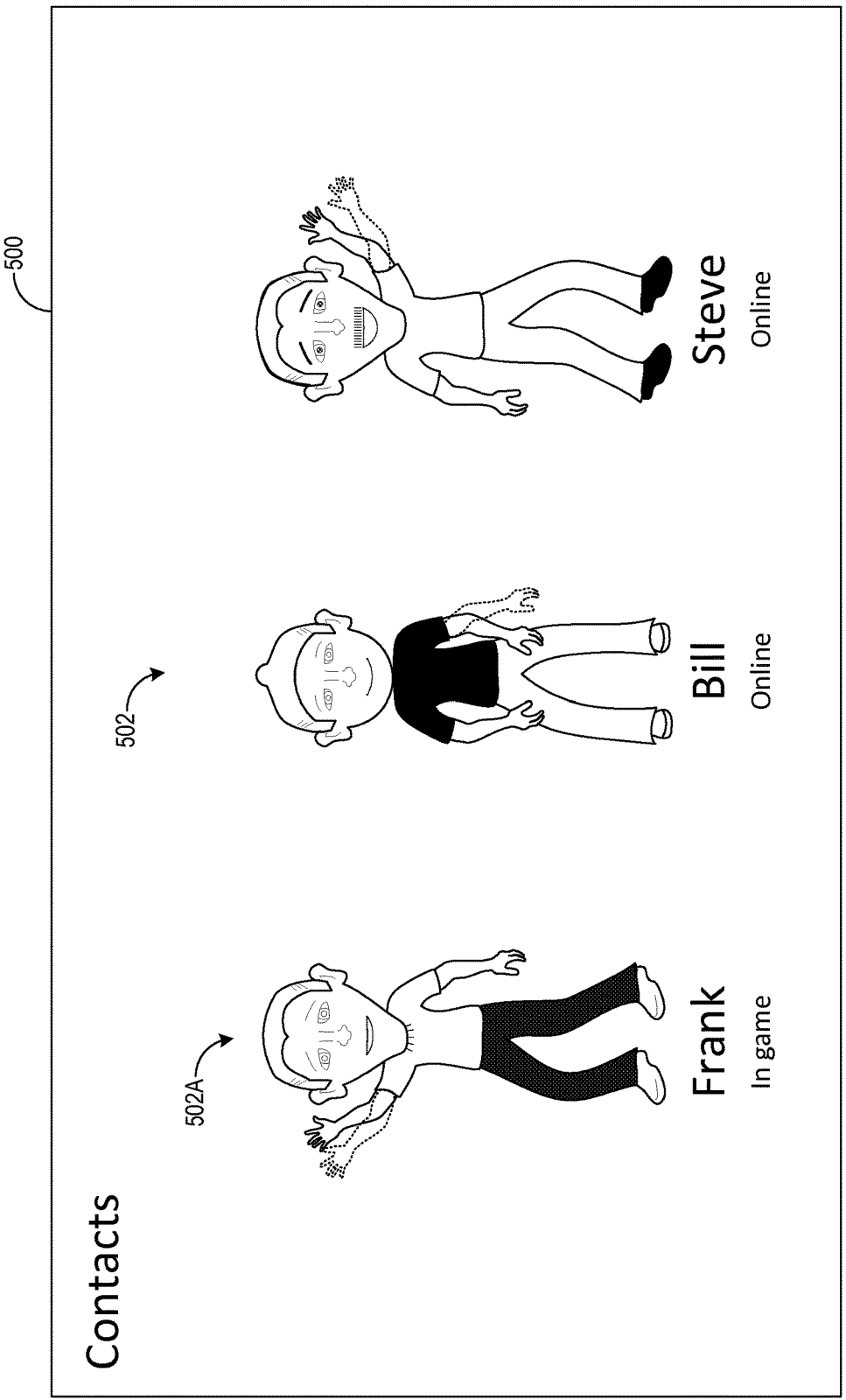
FIG. 5 shows an example user interface including a plurality of avatars each representing a social network contact of a user.

For example, computing device 102 may output the avatars of social network contacts with animations each representing an emotional state of user 104. This may help to provide a feeling to user 104 that social network contacts are sharing in the experiences of user 104, for example by sharing a celebration of a good game or sympathies for a poor game. FIG. 5 shows an example user interface 500 illustrating multiple avatars 502 (e.g., avatar 502A) representing contacts of user 104 (FIG. 1) in social network 120 (FIG. 1). Such a user interface may be output upon user request, or automatically at the conclusion of an activity such as a game played by user 102.

Avatars 502 are depicted as being output with animations representing the emotional state of user 104, which in this example is the relatively excited happy state of FIGS. 2 and 3. Avatars 502 may be output with synchronized or unsynchronized animations. The animation of avatars 502 further may be updated in response to changes in the emotional state of user 104 as they occur (e.g., approximately in real time), may decay in intensity over time, and may otherwise behave similarly to the avatar of user 102.

Figure 6:
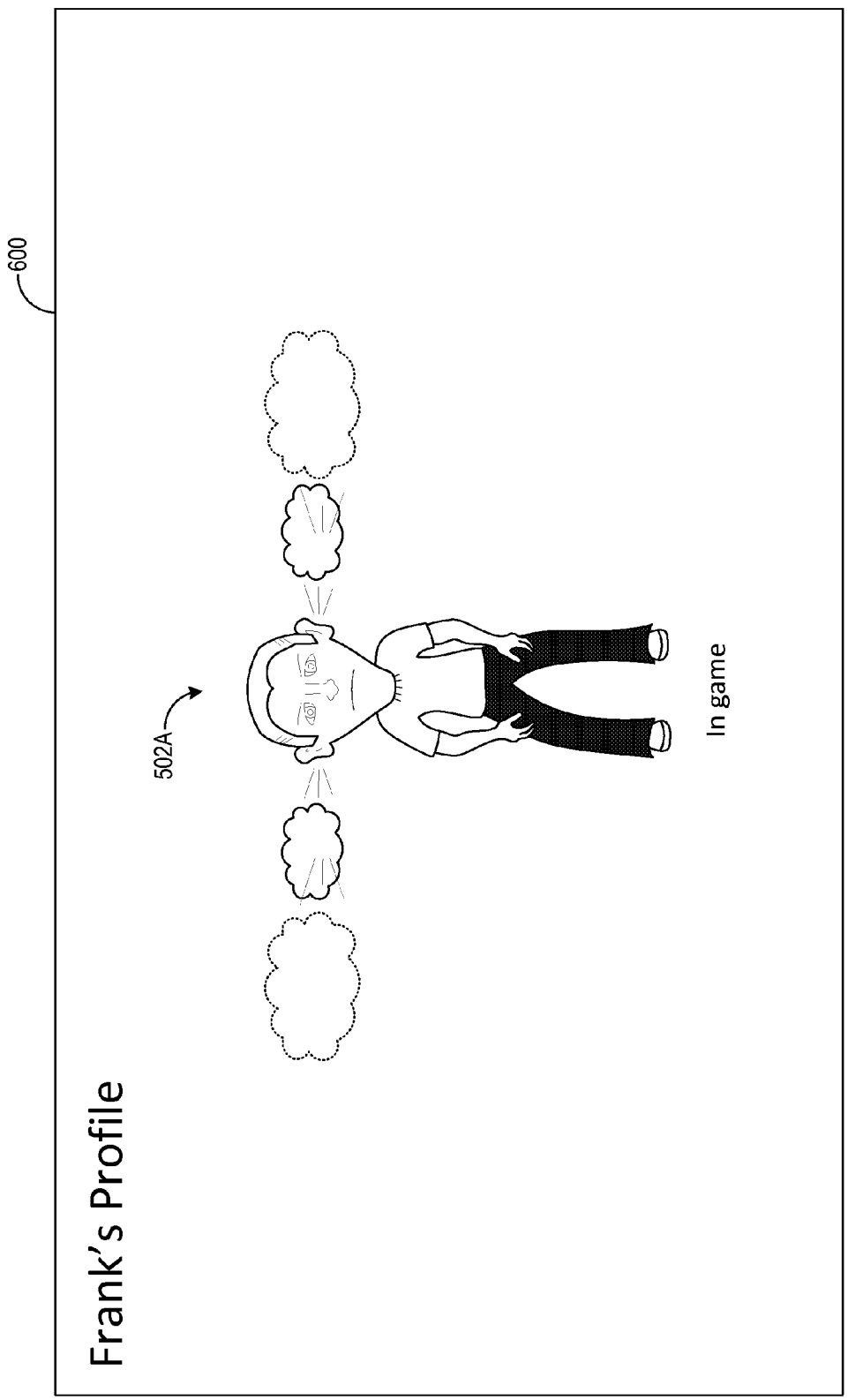
FIG. 6 shows an example user interface including an avatar representing one of the contacts of the user in the social network.

Avatars of social network contacts also may be displayed with animations that reflect the current emotional statuses of the contacts represented by the avatars. FIG. 6 shows an example user interface 600 including avatar 502A (FIG. 5) representing a selected contact of user 104 (FIG. 1) in social network 120 (FIG. 1). Unlike user interface 500 (FIG. 5), user interface 600 is specific to the contact associated with avatar 502A, and may show a user profile of the contact, for example. Avatar 502A is output with an animation representing an excited angry emotional state exhibited by the contact, in contrast to the excited happy state assumed by user 104 that is propagated to avatars 602 in user interface 500 (FIG. 5). This state may have been entered by the user corresponding to avatar 502A (e.g. to share an emotional state with social network contacts), and/or may be based on recent non-contact biometric sensor data of the user associated with avatar 502A.

Figure 7:
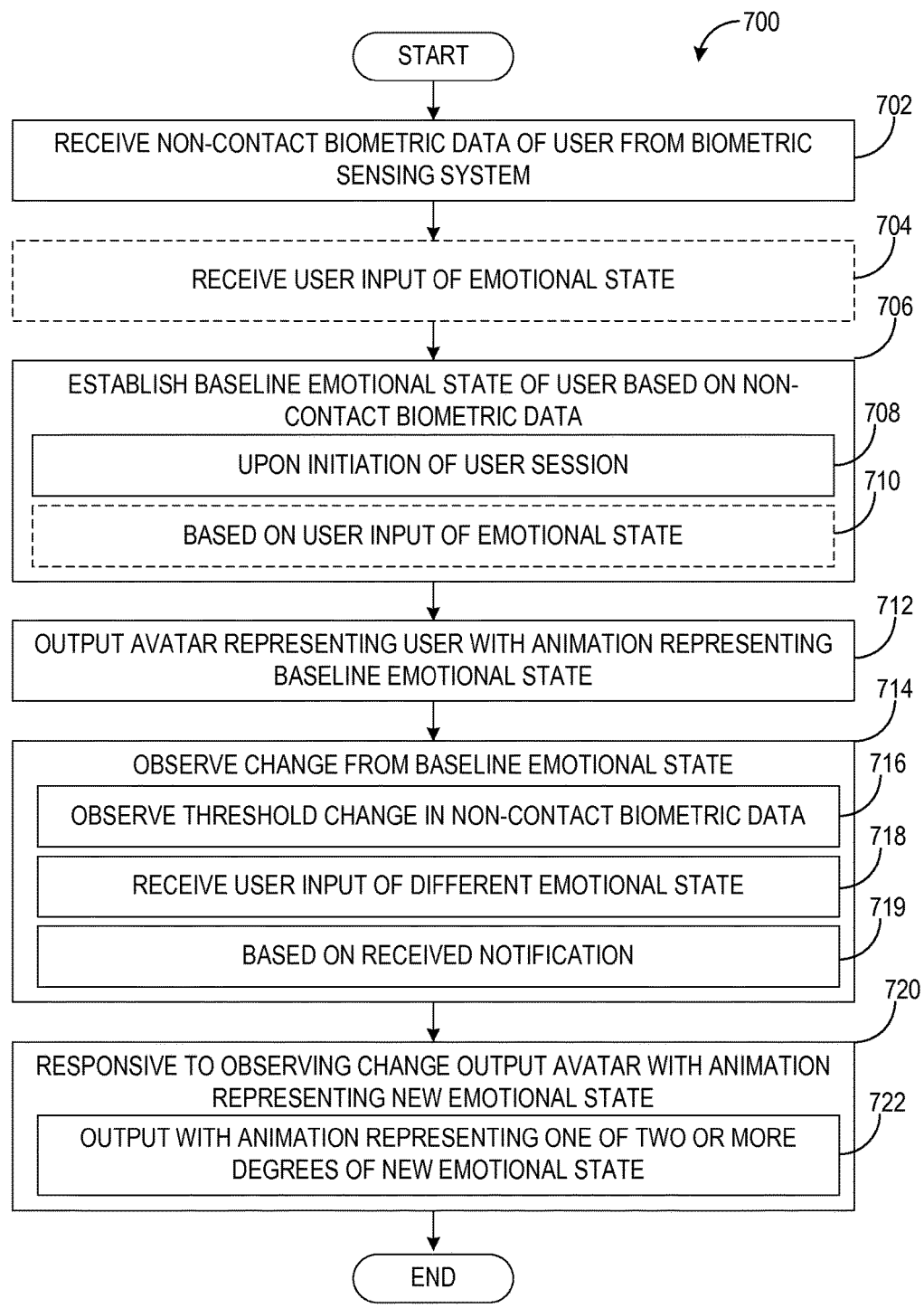
FIG. 7 shows a flowchart illustrating an example method of outputting an avatar with an animation representing user emotional state information.

FIG. 7 shows a flowchart illustrating a method 700 of outputting an avatar with an animation representing user emotional state. FIG. 7 may be performed on any suitable computing device, such as computing device 102 of FIG. 1 and computing system 800 described below with regard to FIG. 8.

Method 700 comprises, at 702, receiving non-contact biometric data for a user from a biometric sensing system. The non-contact biometric data may include any suitable data. Examples include, but are not limited to, one or more of heart rate, eye dilation, skeletal biometrics, gestural biometrics, facial expression, and blood pressure, for example. The biometric sensing system may include one or more of an infrared camera, visible light camera, depth camera, and a microphone, as non-limiting examples. Also, at 704, method 700 may optionally comprise receiving a user input of an emotional state. The user input of the emotional state may be received via a user interface comprising a list of selectable emotional states, for example.

Method 700 further comprises, at 706, establishing a baseline emotional state of the user based on the non-contact biometric data. The baseline state may be established, for example, upon initiation of a user session, as indicated at 708, The baseline state also may be set based on the user input of the emotional state, as indicated at 710, or in any other suitable manner.

Continuing, method 700 includes, at 712, outputting to a display (or to another computing device for display) an avatar representing the user with an animation representing the baseline emotional state. Further, method 700 comprises, at 714, observing a change from the baseline emotional state. Observing the change from the baseline emotional state may include, at 716, observing a threshold change in the non-contact biometric data. The change from the baseline emotional state may alternatively or additionally be observed based on a received user input of a different emotional state (e.g., different from the baseline emotional state), as indicated at 718, based upon a notification received, as indicated at 719, and/or based upon any other suitable factors.

In response to observing the change from the baseline emotional state, method 700 includes, at 720, outputting the avatar with an animation representing a new emotional state. Outputting the avatar with the animation representing the new emotional state may include, at 722, outputting the avatar with an animation representing one of two or more degrees (e.g. one substate of two or more substates) of the new emotional state.

The methods and processes described herein may be tied to a computing system of one or more computing devices. In particular, such methods and processes may be implemented as a computer-application program or service, an application-programming interface (API), a library, and/or other computer-program product.

Figure 8:
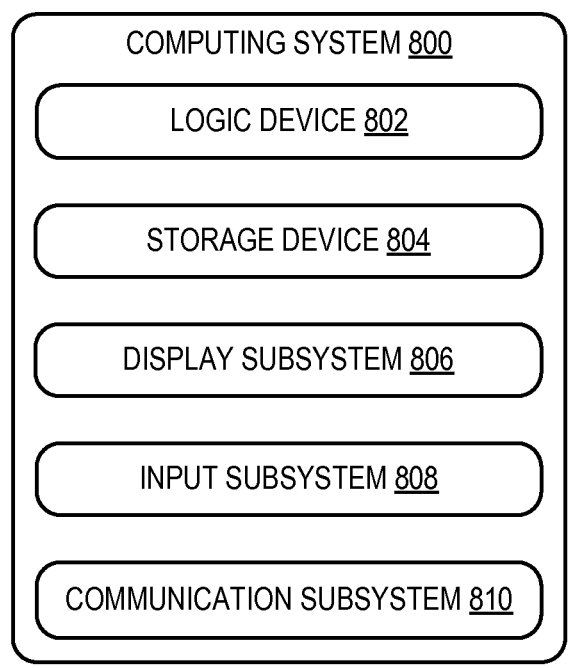
FIG. 8 shows an example computing device.

FIG. 8 schematically shows a block diagram of an example computing system 800 in simplified form. Computing system 800 may take the form of one or more personal computers, server computers, tablet computers, home-entertainment computers, network computing devices, gaming devices, mobile computing devices, wearable computing devices (e.g., head mounted display), mobile communication devices (e.g., smart phone), and/or other computing devices. For example, computing system 100 may represent computing device 100 of FIG. 1.

Computing system 800 includes a logic device 802 and a storage device 804. Computing system 800 may optionally include a display subsystem 806, input subsystem 808, communication subsystem 810, and/or other components not shown in FIG. 8.

Logic device 802 includes one or more physical devices configured to execute instructions. For example, the logic device may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic device may include one or more processors configured to execute software instructions. Additionally or alternatively, the logic device may include one or more hardware or firmware logic devices configured to execute hardware or firmware instructions. Processors of the logic device may be single-core or multi-core, and the instructions executed thereon may be configured for sequential, parallel, and/or distributed processing. Individual components of the logic device optionally may be distributed among two or more separate devices, which may be remotely located and/or configured for coordinated processing. Aspects of the logic device may be virtualized and executed by remotely accessible, networked computing devices configured in a cloud-computing configuration.

Storage device 804 includes one or more physical devices configured to hold instructions executable by the logic device to implement the methods and processes described herein. When such methods and processes are implemented, the state of storage device 804 may be transformed—e.g., to hold different data.

Storage device 804 may include removable and/or built-in devices. Storage device 804 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage device 804 may include volatile, nonvolatile, dynamic, static, read/write, read-only, random-access, sequential-access, location-addressable, file-addressable, and/or content-addressable devices.

It will be appreciated that storage device 804 includes one or more physical devices. However, aspects of the instructions described herein alternatively may be propagated by a communication medium (e.g., an electromagnetic signal, an optical signal, etc.) that is not held by a physical device for a finite duration.

Aspects of logic device 802 and storage device 804 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

It will be appreciated that a "service", as used herein, is an application program executable across multiple user sessions. A service may be available to one or more system components, programs, and/or other services. In some implementations, a service may run on one or more server-computing devices.

When included, display subsystem 806 may be used to present a visual representation of data held by storage device 804. This visual representation may take the form of a graphical user interface (GUI). As the herein described methods and processes change the data held by the storage device, and thus transform the state of the storage device, the state of display subsystem 806 may likewise be transformed to visually represent changes in the underlying data. Display subsystem 806 may include one or more display devices utilizing virtually any type of technology. Such display devices may be combined with logic device 802 and/or storage device 804 in a shared enclosure, or such display devices may be peripheral display devices.

When included, input subsystem 808 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition;

an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity. Non-limiting examples of such componentry are described below with regard to FIG. 9.

When included, communication subsystem 810 may be configured to communicatively couple computing system 800 with one or more other computing devices. Communication subsystem 810 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 800 to send and/or receive messages to and/or from other devices via a network such as the Internet.

Figure 9:
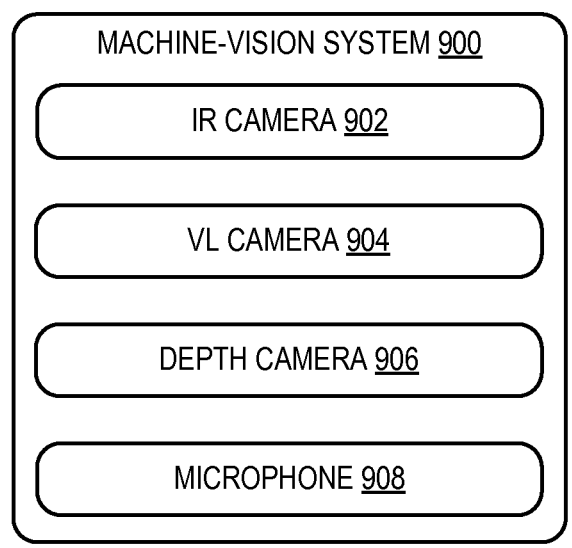
FIG. 9 shows an example machine-vision system.

FIG. 9 schematically shows an example machine-vision system 900. System 900 may be operable to collect one or more forms of non-contact biometric data, and as such, may be at least partially implemented in animating avatars as described herein—e.g., system 900 may be implemented in biometric sensing system 110 (FIG. 1).

System 900 may include one or more of an infrared (IR) camera 902, a visible light (VL) camera 904, a depth camera 906, and a microphone 908.

System 900 may be operable to measure the heart rate of a user. In one example, system 900 may probe the user's skin with visible light (e.g., via VL camera 904) of wavelengths strongly absorbed by hemoglobin. As the capillaries below the skin fill with blood on each contraction of the heart muscle, more of the probe light is absorbed; as the capillaries empty between contractions, less of the probe light is absorbed. Thus, by measuring the periodic attenuation of the probe light, the user's pulse rate can be determined.

System 900 may alternatively or additionally be operable to measure the blood pressure of a user. In one example, system 900 may impinge arteries under the user's skin with IR light (e.g., via IR camera 902) and observe the intensity of reflected IR light by those arteries; the intensity of reflected IR light may be a function of the quantity of blood in these arteries.

System 900 may alternatively or additionally be operable to measure skeletal biometrics. System 900 may use one or both of IR camera 902 and depth camera 906, which may share one or more common components, to construct a depth map of a user comprising a plurality of pixels each including a depth value—e.g., the depth from an optical element of system 900 to the surface represented by that pixel. Depth camera 906 may employ any suitable depth-sensing technologies, including but not limited to time-of-flight (TOF) and structured light technologies.

A virtual skeleton of the user may be assembled based on one or more depth maps. The virtual skeleton may include a plurality of skeletal segments (e.g., bones) pivotally coupled at a plurality of joints. Assembly of the virtual skeleton may include, for example, background subtraction, segmentation, body part classification (e.g., using trained classifiers such as regression forests), among other potential approaches. Once assembled, the virtual skeleton may include a plurality of positional and/or orientation data—e.g., the virtual skeleton may encode three-dimensional positions and rotational orientations of one or more joints, bones, and/or other portions of the virtual skeleton. In this way, a virtual skeleton may be used to assess the pose of a user and to detect gestures performed by the user. Accordingly, system 900 may be operable to measure gestural biometrics.

System 900 may alternatively or additionally be operable to assess the facial expression of a user. To identify and model the face of the user, one or both of IR camera 902 and depth camera 906 may be used. Assessment of facial expression may include geometric analysis (e.g., shape recognition, segmentation) and/or identifying regions where the intensity of reflected IR light corresponds to intensities known to be associated with human skin. In this way, different facial expressions of the user may be classified, where classifications may include, for example, happy, angry, sad, excited, relaxed, etc.

System 900 may alternatively or additionally be operable to collect voice input from a user. Voice input may be collected via microphone 908, for example.

Another example provides a computing device comprising a processor and a storage device comprising instructions executable by the processor to receive non-contact biometric data of a user from a biometric sensing system, establish a baseline emotional state of the user based on the non-contact biometric data, output an avatar representing the user with an animation representing the baseline emotional state, observe a threshold change in the non-contact biometric data, and in response to observing the threshold change in the non-contact biometric data, output the avatar with an animation representing a new emotional state. In such an example, the instructions may alternatively or additionally be executable to establish the baseline emotional state upon initiation of a user session. In such an example, the instructions may alternatively or additionally be executable to establish the baseline emotional state based on a user input of an emotional state. In such an example, the instructions may alternatively or additionally be executable to output the avatar with an animation representing one of two or more degrees of the new emotional state, each degree represented by a respective animation. In such an example, the instructions may alternatively or additionally be executable to receive a notification from an application, and output the avatar with an animation representing an emotional state based on the notification. In such an example, the instructions may alternatively or additionally be executable to receive a heart rate, and to observe a threshold change in the heart rate. In such an example, the instructions may alternatively or additionally be executable to receive one or more of heart rate, eye dilation, skeletal biometrics, gestural biometrics, facial expression, and blood pressure. In such an example, the instructions may alternatively or additionally be executable to receive the non-contact biometric data via an infrared camera. In such an example, the instructions may alternatively or additionally be executable by the processor to adjust a speed of motion within an animation based upon a time between establishment of the baseline emotional state and observation of the threshold change. Any or all of the above-described examples may be combined in any suitable manner in various implementations.

Another example provides, on a computing device comprising a processor, a method comprising receiving, via the processor, non-contact biometric data of a user from a biometric sensing system, receiving, via the processor, a user input of an emotional state, establishing, via the processor, a baseline emotional state of the user based on the non-contact biometric data and the user input of the emotional state, outputting, via the processor, an avatar representing the user with an animation representing the baseline emotional state, observing, via the processor, a change from the baseline emotional state based on one or both of a threshold change in the non-contact biometric data and a received user input of an emotional state different from the baseline emotional state, and in response to observing the change from the baseline emotional state, outputting, via the processor, the avatar with an animation representing a new emotional state. In such an example, the baseline emotional state may alternatively or additionally be established upon initiation of a user session. In such an example, the new emotional state may alternatively or additionally comprise two or more degrees each represented by a respective animation. In such an example, the method may alternatively or additionally comprise receiving a notification from an application, and outputting the avatar with an animation representing an emotional state based on the notification. In such an example, the non-contact biometric data may alternatively or additionally include a heart rate, and wherein the threshold change in the non-contact biometric data is a threshold change in the heart rate. In such an example, the biometric sensing system may alternatively or additionally include an infrared camera. In such an example, the method may alternatively or additionally comprise adjusting a speed of motion within an animation based upon a time between establishment of the baseline emotional state and observation of the change from the baseline emotional state. In such an example, the method may alternatively or additionally comprise reducing an influence of the user input of the new emotional state as a function of time. In such an example, the user input of the emotional state may alternatively or additionally be received via a user interface comprising a list of selectable emotional states. Any or all of the above-described examples may be combined in any suitable manner in various implementations.

Another example provides, on a computing device comprising a processor, a method comprising receiving non-contact biometric data of a user from a biometric sensing system, establishing an emotional state of the user based on the non-contact biometric data, outputting an avatar representing the user with an animation representing the emotional state of the user, and outputting respective avatars of one or more contacts of the user in a social network each with the animation representing the emotional state of the user. In such an example, the method alternatively or additionally comprises receiving a user request to view a profile of one of the one or more contacts of the user in the social network, and, in response to receiving the user request to view the profile of the contact, outputting an avatar of the contact with an animation representing an emotional state of the contact. Any or all of the above-described examples may be combined in any suitable manner in various implementations.

It will be understood that the configurations and/or approaches described herein are presented for example, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A computing device, comprising:
a processor; and
a storage device comprising instructions executable by the processor to
  receive non-contact biometric data of a first user from a biometric sensing system;
  establish a baseline emotional state of the first user based on a user input of an emotional state;
  output an avatar representing the first user with an animation representing the baseline emotional state;
  output an avatar of a second user with the animation representing the baseline emotional state established for the first user, the second user being a contact of the first user in a social network;
  observe a threshold change in the non-contact biometric data of the first user from the baseline emotional state to a new emotional state;
  in response to observing the threshold change in the non-contact biometric data, output the avatar representing the first user with an animation representing the new emotional state; and
  output the avatar representing the second user with the animation representing the new emotional state without regard to an emotional state of the second user.

2. The device of claim 1, wherein the instructions are executable to establish the baseline emotional state upon initiation of a user session.

3. The device of claim 1, wherein the instructions are executable to output the avatar representing the first user with an animation representing one of two or more degrees of the new emotional state, each degree represented by a respective animation.

4. The device of claim 1, wherein the instructions are executable to receive a notification from an application, and output the avatar representing the first user with an animation representing an emotional state based on the notification.

5. The device of claim 1, wherein the instructions are executable to receive a heart rate, and to observe a threshold change in the heart rate.

6. The device of claim 1, wherein the instructions are executable to receive one or more of heart rate, eye dilation, skeletal biometrics, gestural biometrics, facial expression, and blood pressure.

7. The device of claim 1, wherein the instructions are executable to receive the non-contact biometric data via an infrared camera.

8. The device of claim 1, wherein the instructions are executable by the processor to adjust a speed of motion within the animation representing the new emotional state based upon a time between establishment of the baseline emotional state and observation of the threshold change.

9. A method implemented on a computing device comprising a processor, the method comprising:
  receiving, via the processor, non-contact biometric data of a first user from a biometric sensing system;
  receiving, via the processor, a user input of an emotional state;
  establishing, via the processor, a baseline emotional state of the first user based on the non-contact biometric data and the user input of the emotional state;
  outputting, via the processor, an avatar representing the first user with an animation representing the baseline emotional state;

outputting, via the processor, an avatar of a second user with the animation representing the baseline emotional state, the second user being a contact of the first user in a social network;

observing, via the processor, a change from the baseline emotional state of the first user to a new emotional state different from the baseline emotional state based on one or both of a threshold change in the non-contact biometric data and a received user input of the new emotional state, the new emotional state comprising one of two or more degrees of emotional state each represented by a respective animation;

in response to observing the change from the baseline emotional state, outputting, via the processor, the avatar representing the first user with an animation representing the one of the two or more degrees of the new emotional state;

when the new emotional state is the same as an emotional state of the second user, outputting the avatar representing the second user with the animation representing the one of the two or more degrees of the new emotional state; and when the new emotional state is different from the emotional state of the second user, outputting the avatar representing the second user with the animation representing the one of the two or more degrees of the new emotional state.

10. The method of claim 9, wherein the baseline emotional state is established upon initiation of a user session.

11. The method of claim 9, further comprising receiving a notification from an application, and outputting the avatar representing the first user with an animation representing an emotional state based on the notification.

12. The method of claim 9, wherein the non-contact biometric data includes a heart rate, and wherein the threshold change in the non-contact biometric data is a threshold change in the heart rate.

13. The method of claim 9, wherein the biometric sensing system includes an infrared camera.

14. The method of claim 9, further comprising adjusting a speed of motion within the animation representing the new emotional state based upon a time between establishment of the baseline emotional state and observation of the change from the baseline emotional state.

15. The method of claim 9, further comprising reducing an influence of the user input of the new emotional state as a function of time.

16. The method of claim 9, wherein the user input of the new emotional state is received via a user interface comprising a list of selectable emotional states.

17. A method implemented on a computing device comprising a processor, the method comprising:
receiving non-contact biometric data of a first user from a biometric sensing system;
establishing an emotional state of the first user based on the non-contact biometric data;
outputting an avatar representing the first user with an animation representing the emotional state of the first user;
outputting an avatar of a second user with the animation representing the emotional state of the first user, the second user being a contact of the first user in a social network;
receiving a notification from an application;
outputting the avatar representing the first user with an animation representing an emotional state based on the notification; and
outputting the avatar representing the second user with the animation representing the emotional state based on the notification without regard to an emotional state of the second user.

18. The method of claim 17, further comprising receiving a user request to view a profile of the second user in the social network, and, in response to receiving the user request to view the profile of the second user, outputting the avatar of the second user with an animation representing the emotional state of the second user.

* * * * *